United States Patent [19]

Colwell et al.

[11] Patent Number: 5,978,654
[45] Date of Patent: Nov. 2, 1999

[54] ALPHANUMERIC PAGING ENTRY SYSTEM

[75] Inventors: Kevin Colwell, Middleton; Robert M. Engelke, Madison, both of Wis.

[73] Assignee: Ultratec, Inc., Madison, Wis.

[21] Appl. No.: 08/481,852

[22] Filed: Jun. 7, 1995

Related U.S. Application Data

[63] Continuation-in-part of application No. 08/367,563, Jan. 3, 1995, abandoned.

[51] Int. Cl.$^6$ ........................................................ H04Q 7/08
[52] U.S. Cl. ...................... 455/31.1; 379/355; 340/825.52
[58] Field of Search .................... 379/57, 355; 370/94.1; 340/825.52, 825.14; 395/893; 455/31.1

[56] References Cited

U.S. PATENT DOCUMENTS

| | | |
|---|---|---|
| Re. 32,365 | 3/1987 | Sebestyen . |
| 3,507,997 | 4/1970 | Weitbrecht . |
| 3,896,267 | 7/1975 | Sachs et al. . |
| 3,976,995 | 8/1976 | Sebestyen ........................... 340/825.44 |
| 4,126,768 | 11/1978 | Grenzow . |
| 4,201,887 | 5/1980 | Burns . |
| 4,268,721 | 5/1981 | Nielson et al. . |
| 4,354,252 | 10/1982 | Lamb et al. . |
| 4,415,065 | 11/1983 | Sandstedt . |
| 4,451,701 | 5/1984 | Bendig . |
| 4,490,579 | 12/1984 | Godoshian . |
| 4,569,421 | 2/1986 | Sandstedt . |
| 4,625,080 | 11/1986 | Scott . |
| 4,799,254 | 1/1989 | Dayton et al. . |
| 4,817,135 | 3/1989 | Winebaum ............................... 379/355 |
| 4,918,723 | 4/1990 | Iggulden et al. . |
| 4,926,460 | 5/1990 | Gutman et al. . |
| 4,951,043 | 8/1990 | Minami ............................... 340/825.44 |
| 4,959,847 | 9/1990 | Engelke et al. . |
| 4,995,077 | 2/1991 | Malinowski . |
| 5,081,673 | 1/1992 | Engelke et al. . |
| 5,091,906 | 2/1992 | Reed et al. . |
| 5,099,507 | 3/1992 | Mukai et al. ............................... 379/57 |
| 5,121,421 | 6/1992 | Alheim . |
| 5,163,081 | 11/1992 | Wycherley et al. . |
| 5,192,947 | 3/1993 | Neustein . |
| 5,249,220 | 9/1993 | Moskowitz et al. . |
| 5,280,516 | 1/1994 | Jang . |
| 5,311,516 | 5/1994 | Kuznicki et al. ...................... 370/94.1 |
| 5,325,417 | 6/1994 | Engelke et al. . |
| 5,327,479 | 7/1994 | Engelke et al. . |
| 5,339,358 | 8/1994 | Danish et al. . |
| 5,343,519 | 8/1994 | Feldman . |
| 5,351,288 | 9/1994 | Engelke et al. . |
| 5,359,651 | 10/1994 | Draganoff . |
| 5,377,263 | 12/1994 | Bazemore et al. . |
| 5,396,650 | 3/1995 | Terauchi . |
| 5,459,458 | 10/1995 | Richardson et al. ............... 340/825.52 |
| 5,522,089 | 5/1996 | Kikinis et al. ........................... 395/893 |
| 5,581,593 | 12/1996 | Engelke et al. ........................... 379/52 |

FOREIGN PATENT DOCUMENTS

| | | |
|---|---|---|
| 2749-923 | 5/1979 | Germany . |
| 60-259058 | 12/1985 | Japan . |
| 93/23947 | 11/1993 | WIPO . |

*Primary Examiner*—William Cumming
*Attorney, Agent, or Firm*—Quarles & Brady LLP

[57] ABSTRACT

A low cost alphanumeric paging entry and page receiving device for entering alphanumeric messages remotely from a telephone and receiving pages via radio frequency signals. The device is designed so that both page reception and alphanumeric page entry can be provided using substantially the same hardware. The entry functionality uses simplex communications, using a system of Baudot tones to send page messages to a paging system for transmission to other similar devices.

18 Claims, 14 Drawing Sheets

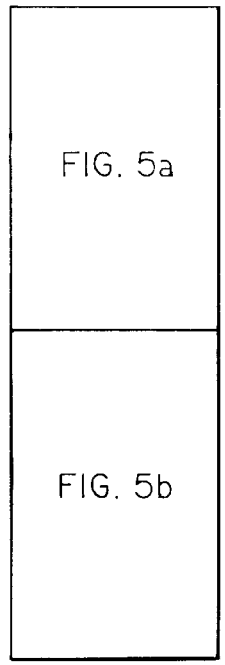
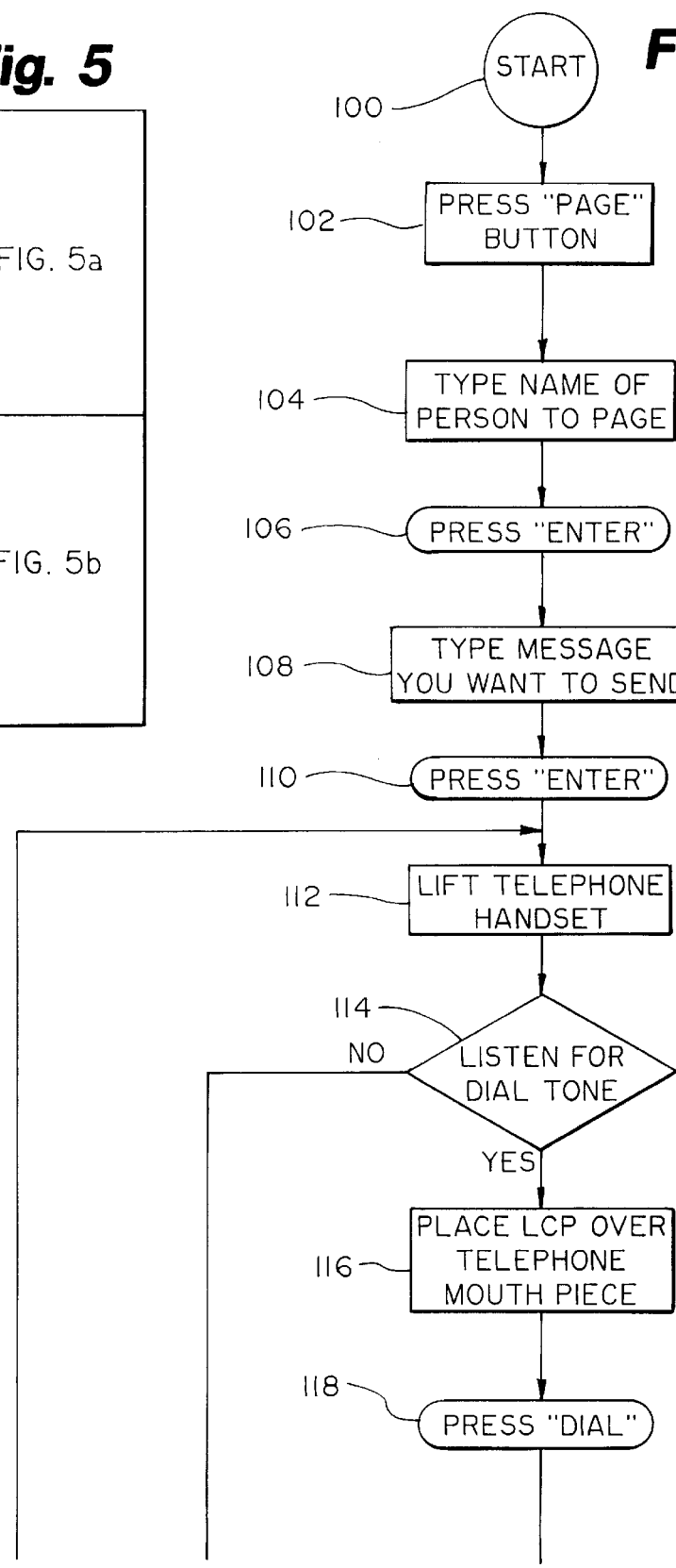

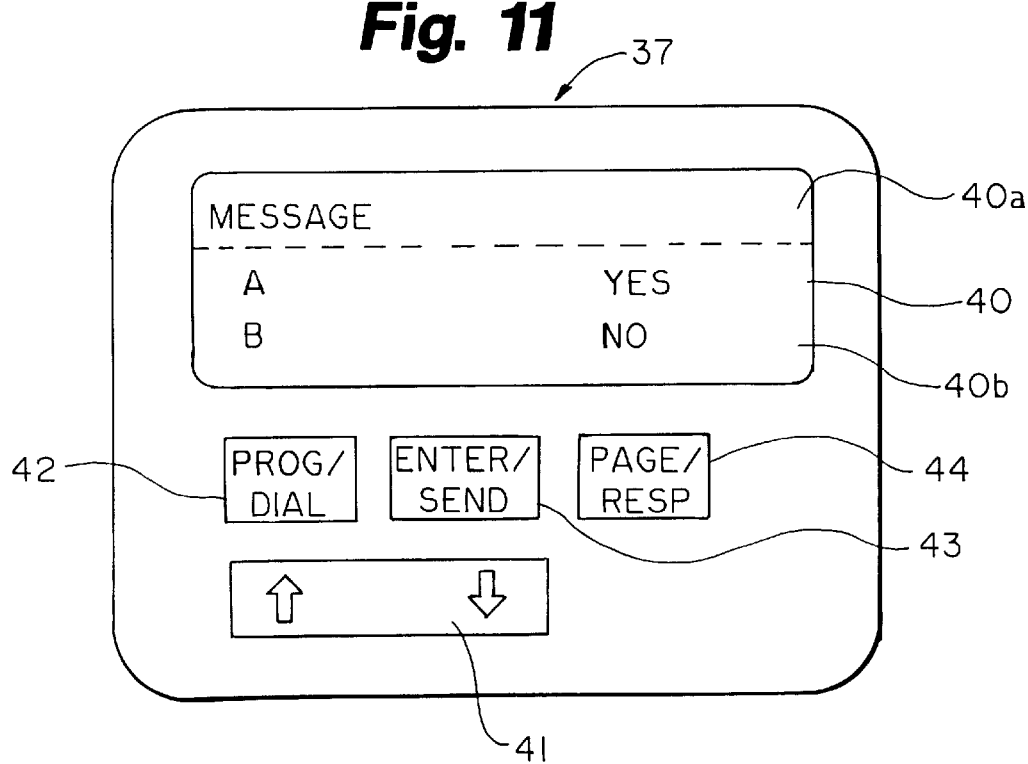
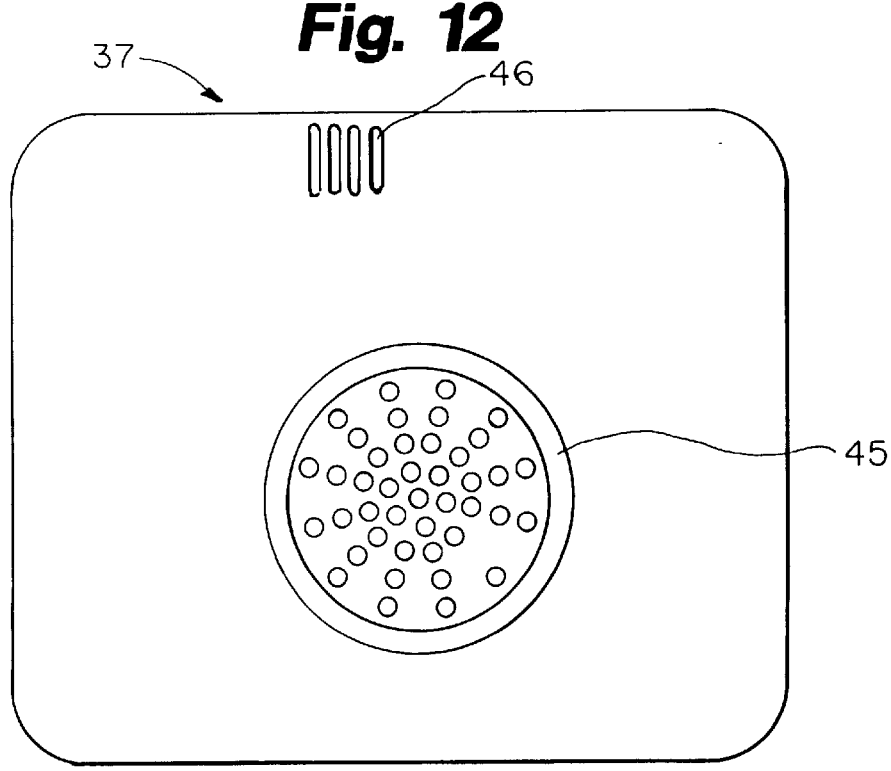

ALPHANUMERIC PAGING ENTRY SYSTEM

This patent application is a continuation in part of U.S. patent application Ser. No. 08/367,563 which was filed on Jan. 3, 1995 now abandoned.

FIELD OF THE INVENTION

The present invention relates to the general field of radio personal pagers and relates specifically to a combination device for both the input of alphanumeric characters into, and receiving alphanumeric pages via, an alphanumeric paging system.

BACKGROUND OF THE INVENTION

Personal pagers are small battery powered devices worn by individuals so that messages can be transmitted to them by radio frequency from a remote message sender. The currently available pagers are of two general categories. Numeric only pagers are capable of receiving only a single type of message, i.e. a numeric message, which is typically the telephone number of the person sending a message to the person being paged.

Alphanumeric pagers, by contrast, permit the transmission of both language as well as numeric information, and thus permit the transmission of short messages to an individual being paged. Both pagers rely on a network of radio transmitters and particularized identification codes, referred to as CAP CODES so that each particular individual who is wearing a pager can be identified when a page is intended for that individual.

Paging systems operate on the basis of a paging center which transmits out coded information, on an assigned radio frequency, to all of the pagers associated with that system. The particular personal pager which has its CAP CODE identified in any particular transmission is the only one that receives and displays that transmission. If a system is operated by a central dispatcher, which is the only one sending paging messages to the various pagers in the field, it is not a particular problem to devise a method for the input of the numeric or text information into the paging system. However, when paging services are offered to the public at large, and large and small businesses broadly, the methods by which paging information or messages are provided as inputs to the alphanumeric system becomes a greater logistical and technical problem.

For numeric pagers, the input of numeric information to the paging system is a relatively straight forward operation. A user dials the paging system which is typically operated by a robotic or computer controlled device. The system device tells the user, with appropriate computerized voice cues, to enter the information as to the PIN of the person to be paged and the numeric message to be sent in the page message, with the user entering that information by pressing numbers on his or her telephone dial pad. The tones generated by a touch tone telephone, known as DTMF, can convey numeric information to the paging station, which can then transmit the page message to the desired individual.

With alphanumeric paging systems, the process is a little more complicated because of the demands of entering text data at remote locations. One type of system utilizes a live operator who answers a call in voice and then receives the message verbally over the telephone line from the remote caller. The operator then enters the text information into a keyboard associated with the paging transmission unit, and the page is properly formatted and sent to its intended recipient. However, this method is relatively expensive, in that it requires a system of stand-by operators available at all times, and does not provide the speed and privacy that many users would like in an alphanumeric paging system.

Current alphanumeric paging systems accept textual information from remote data entry points using a common protocol. One such protocol, known as the telocator alphanumeric protocol (or TAP), was designed to facilitate transmission from computer to computer of the input information for alphanumeric paging systems. In one sense, the protocol is not a communication protocol, since it relies on conventional computer to computer modem communications. Any of several modem protocols may be used for the actual electronic protocol. For example, the current TAP protocol recommends that a Bell 103 compatible modem be used to transmit 300 Baud information. Other speeds or modem types can be used as appropriate.

As usual, all such modems operating under standard ASCII or CCITT protocols for computer transmission of information require handshakes, both send and receive capability, and full duplex capability. The TAP protocol is intended to define within the transmission from a remote computer or digital facility to a paging terminal how the data internally in the packet is characterized so that the receiving terminal can recognize the PIN and identify the message to be transmitted to the individual to be paged. Other alphanumeric paging entry protocols are also in common use, all of which are also based on standard computer communication methods.

The availability of TAP-based alphanumeric paging terminals allows users with remote computers to input alphanumeric paging messages to be transmitted by the paging system. While this expands the network of available senders of an alphanumeric paging message, it still requires the expense and often the bulk of a computer, or at least a device with full duplex handshake modems, with specific software, in order to properly enter alphanumeric information into the system.

SUMMARY OF THE INVENTION

The present invention is summarized in that a low cost, combined alphanumeric entry and paging device (AEDP) for use with a paging system is disclosed. The entry device is capable of transmitting alphanumeric messages in a special code format to an input terminal or gateway of an alphanumeric paging system. The device includes a keyboard, microprocessor, display, speaker, and other electronic components, and provides as its principle output a tone sequence out of its speaker which can be fed into an input microphone of a conventional telephone handset. The device is programmed to provide, in a defined format, just the information to the remote terminal necessary to effectuate an alphanumeric page to the intended recipient. The remote terminal accepts the information and converts the information into a radio frequency paging message which is sent to the intended recipient.

This AEDP avoids the necessity of having full duplex communication and two-way handshaking with the remote terminal, and the expense associated with that capability, by utilizing the user as a feed back device to control its operation.

In addition, because the AEDP also includes paging functionality, where each of two users is carrying an AEDP, the two users can communicate back and forth via the paging network. In such a case, a message recipient can generate a response to a received message using the AEDP, locate a telephone, and deliver the response to the original sender via the sender's AEDP.

It is one object of the invention to provide a single remote device that can both receive alphanumeric page messages and can transmit alphanumeric page messages to other pagers. An alphanumeric entry device and a pager can be combined into one device facilitating convenient transport and operation.

Another object is to combine an alphanumeric entry device and a pager to allow for sharing of similar hardware components which reduces costs for users requiring both message sending and receiving capability. Both a pager and an alphanumeric entry device require nearly identical hardware including a microprocessor, memory buffer, keyboard, display, read only memory unit, and a speaker. Thus, an AEDP can be built where the alphanumeric entry and pager functionality are both implemented using nearly the same hardware, the different functionality being provided nearly entirely in software stored in a read only memory block. In this manner, a single device can be provided which is approximately the same size and cost as a conventional pager.

The AEDP should be programmed so that both the alphanumeric entry device and pager can access a common RAM. Commonly addressed AEDP addresses may be stored in the common RAM. For example, where a business provides AEDPs to all of its forty sales representatives, each AEDP would include AEDP address information required to send page messages to each of the sales representatives separately. Thus, instead of keying in address information each time a message is sent, a user scrolls through addresses in the RAM to chose an address or simply enters an intended recipients name to chose an address, and send a message.

Where both paging and alphanumeric entry applications can both access the same RAM, various other enhancements can be implemented. For example, when a message is received, the sender's AEDP may transmit additional information sufficient to identify the sender's address in the receiving AEDP's RAM. In the alternative, where the sender's address is not stored in the receiving AEDP's RAM, the sending AEDP may transmit, in conjunction with a message, information sufficient to identify the sender's address. The receiving AEDP stores the sender's address information in a RAM storage buffer, only identifying the sender in a perfunctory manner on the display (i.e. with initials or the like).

Thus, another object is to provide a simple AEDP which facilitates easy response to received messages. If a message requires a response, the receiver can key in a response and send the response to the sender without identifying the sender's address information. The AEDP can simply access the RAM storage buffer and transmit the response to the address stored therein. This is particularity useful when the address of the sending AEDP is not consistently accessed and hence would not be stored in a common RAM.

One more object of the invention is to provide a downloading mechanism for inputting commonly used address data into the common RAM. The common RAM can quickly be updated by sending address information to all AEDPs requiring the information via a page message, the updating data being identified as such by a specific character in a message packet, and being stored appropriately.

Where an AEDP address is either added to or removed from a system, instead of reprogramming each of the system AEDPs through a mechanical hook-up, an update page can be transmitted which either adds additional address information to, or subtracts appropriate address information from, the storage buffer.

Other objects, advantages, and features of the present invention will become apparent from the following specification when taken in conjunction with the accompanying drawings.

BRIEF DESCRIPTION OF THE DRAWINGS

FIG. 11 is a top plan view of a second embodiment of an alphanumeric paging device constructed in accordance with the present invention;

FIG. 12 is a rear plan view of the device of FIG. 11;

DETAILED DESCRIPTION OF THE INVENTION

In order to be consistent in terminology, several terms will be used with specific meanings throughout this specification. The system described here will often be referred to as a low cost paging or LCP system. The communication protocol described here will sometimes be called the LCP protocol, and the device described below for alphanumeric entry and page reception will sometimes be referred to as an AEDP. The person using the AEDP to send a page will be referred to as the sender, while the person being paged is referred to as the recipient. In current wireless paging networks, the electronic center into which paging information is entered, in a computer modem protocol and the TAP format, for transmission to the recipients is conventionally called a terminal, and that terminology is used here.

It is envisioned that, at some point in the future, terminals will be adapted to receive an LCP format message, but currently they cannot. Another device is therefore envisioned which can receive an LCP message from an AEDP and then transmit that message in modem format to a conventional terminal, and that device is referred to as a "gateway".

Before describing the operation of the AEDP 10 in detail, it is helpful first to understand what the intended function of the AEDP 10 is. A user may use the device 10 to formulate and construct an alphanumeric message which is then to be transmitted over conventional telephone lines to a gateway which will convert the message to a form which can be transmitted to a terminal (e.g. to TAP). The terminal sends the message over the wireless alphanumeric paging system to be ultimately received by a recipient. In order to facilitate making the AEDP 10 of the lowest possible cost and maximum ease of use, the AEDP 10 does not include any capability to receive or detect tones or communications back from the gateway over the telephone line. It is a device which communicates in only one direction on a telephone line and which requires the participation of the user to successfully operate and introduce a message along the line into the paging system.

However, the present AEDP 10 can also receive and display alphanumeric page messages which are transmitted via radio frequency (rf) signals. Thus, the AEDP 10 operates both as an alphanumeric entry device and as a pager. In addition to providing both message entry and reception in a single device, this combination generates synergies which minimize hardware costs and provide other useful functionality. The AEDP hardware will be described first, followed by the alphanumeric functionality of the AEDP, the paging functionality, and a discussion of a plurality of synergistic advantages resulting from implementing both the entry and paging functionalities with the same hardware.

AEDP Hardware

Figure 1:
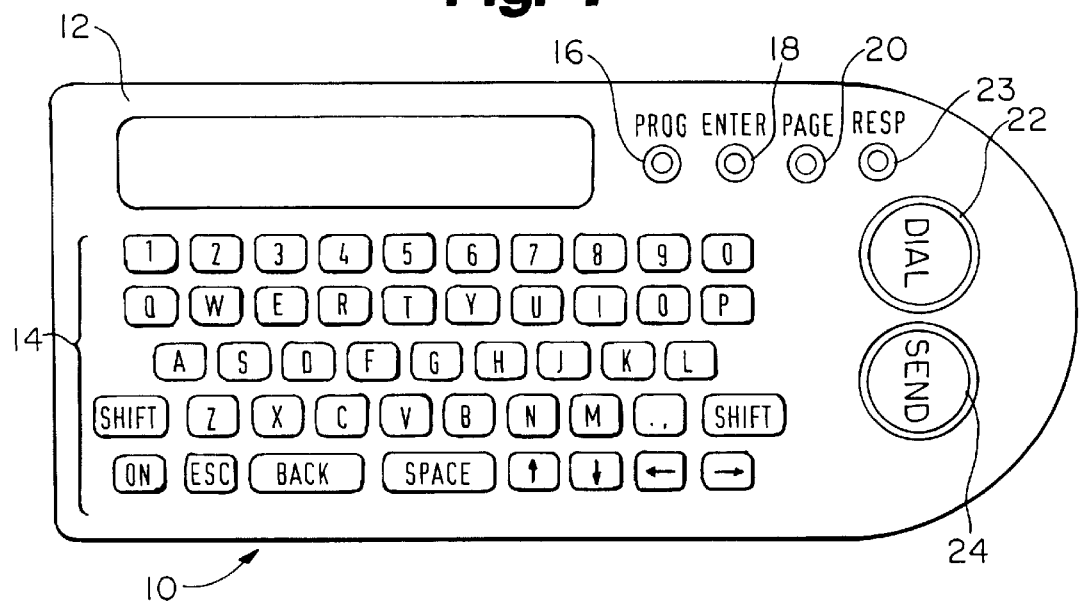
FIG. 1 is a top plan view of a hand-held alphanumeric paging device constructed in accordance with the present invention.
Figure 2:
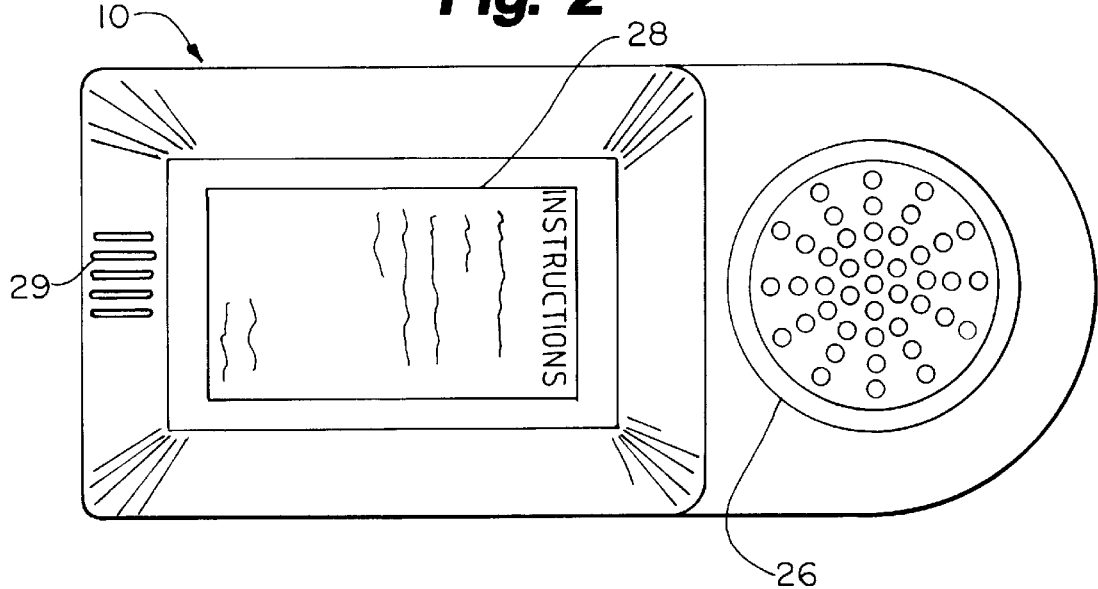
FIG. 2 is a rear plan view of the device of FIG. 1.

Shown in FIGS. 1, and 2 are front, and back views of a first embodiment of an AEDP generally indicated at 10. This AEDP 10 is a small, compact, pocket-size device approximately the size and weight of a pocket calculator. On its front face, the AEDP 10 includes an alphanumeric display 12, which can be liquid crystal, LED, or any suitable alphanumeric display assembly which can readily be driven by battery power. Underneath the liquid crystal 12 is a keyboard, generally indicated at 14, containing all the conventional keys of a conventional typewriter or computer keyboard, although reduced somewhat is size.

In the upper right hand corner of the device are four special buttons. A program button entitled "PROG" is indicated at 16, an "ENTER" button is indicated at 18, a button indicated at 20 is labeled "PAGE" and a "RESP" button is indicated at 23. Finally, on the right hand side of the front of the AEDP 10 are two large and conspicuous buttons located at one end of the device, without any smaller buttons adjacent to them. One such button, designated 22, is entitled "DIAL" while the other button has a legend on it which reads "SEND." These particular buttons are larger than the rest of the keys on the device, and are intended to be approximately finger size of a normal adult. In order to fit the remaining keys on the device and still have it be a modest size, the keyboard 14 itself is of relatively small size including rubber keys of the type normally associated with hand held calculators.

Shown in FIG. 2 is the reverse side of the hand held paging device 10 shown in FIG. 1. Three conspicuous features are apparent. A first feature is an audio speaker designated at 26. A second feature is a panel of indicia, indicated at 28, on which instructions for the use of the device may be printed. A third feature is a radio frequency receiver 29 for receiving analog radio frequency paging messages. Not shown, but incorporated into the design, are features for containing and replacing the battery contained within the device 10.

Figure 3:
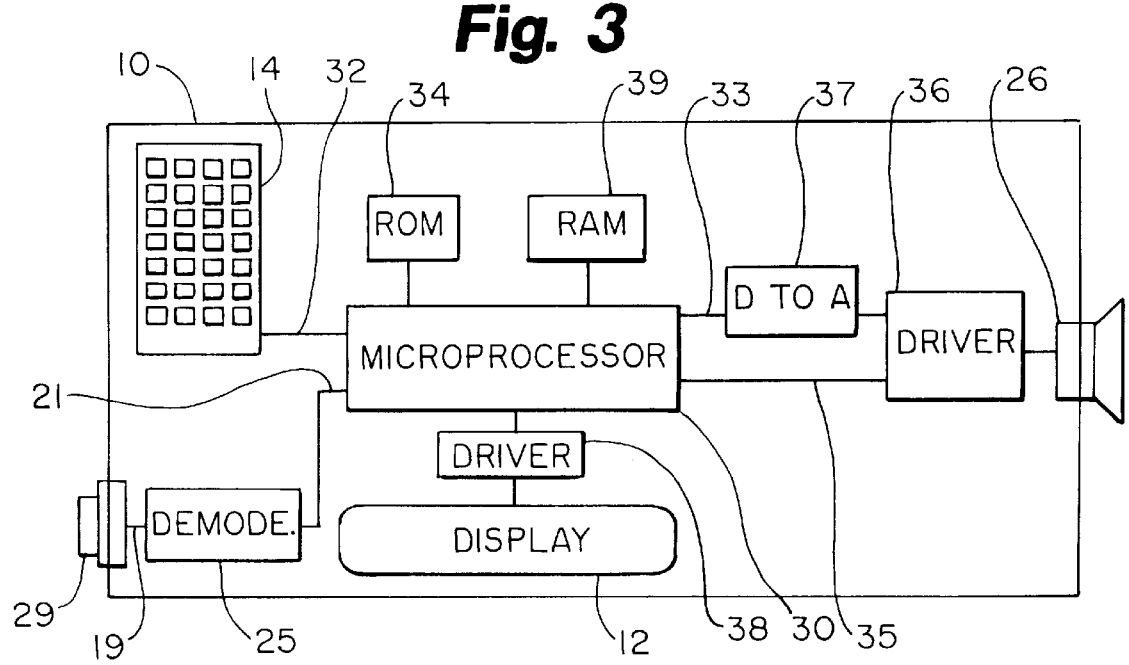
FIG. 3 is a schematic illustration of the main electronic components of the device of FIG. 1.

Referring to FIG. 3, the internal components of the AEDP are simple. A microprocessor 30 is capable of receiving input data from two different sources. First, the microprocessor 30 is connected to the keyboard 14 via connector 32 for remote entry of information. Second, the microprocessor 30 is connected to the radio frequency (rf) receiver 29 via connectors 19 and 21 and an demodulator 25 for receiving page messages via an appropriate radio frequency. The demodulator 25 converts analog rf signals to digital signals as well known in the electronic art.

A ROM, or read only memory 34, is provided to contain the programming for the microprocessor 30. The outputs from the microprocessor 30 include two direct digital output lines 33, 35. The output line 33 is fed through a very simple digital to analog converter 37 for use in generating DTMF tones from the microprocessor output. The other digital microprocessor output 35 is provided as input to a speaker driver 36, combined with the output of the digital to analog converter 37. The output of speaker driver 36 is connected to the audio speaker 26. The speaker driver is optional and is used to buffer the digital output of the microprocessor so as to filter the square edges of its digital output and, if necessary, slightly amplify the output to make it louder.

A RAM, or random access memory 39, is also connected to the microprocessor 30 for storing commonly used information which can be altered from time to time. Information stored in the RAM 39 includes user PIN numbers, system telephone numbers, and other data identifying system characteristics. The microprocessor 30 is also connected to a display driver 38 which drives the alphanumeric display 12.

The alphanumeric display 12 displays messages entered on keypad 14 and messages received via receiver 29. In addition, the display 12 can be used in conjunction with the keypad 14 to scroll through information included in the common RAM 39 for selection or editing purposes.

Alphanumeric Entry Functionality

Figure 4:
FIG. 4 is a sketch of the method of utilization of the device of FIGS. 1 and 2 in its normal operation.

To send an alphanumeric message using an AEDP 10, the user types a message into an AEDP 10 using the keyboard 14, following cues from the device. Once the message has been formulated, the user picks up a telephone. The user then places the AEDP 10 physically on the handset of the telephone such that the speaker 26 of the AEDP 10 is adjacent to the microphone of the handset. This is illustrated in FIG. 4. If the telephone is a coin telephone, the user would then have to insert the appropriate fee. Then the user utilizes only the two large and convenient buttons 22 and 24 to operate the device 10. When the user presses the DIAL button 22, the AEDP 10 will automatically present DTMF tones into the telephone to dial the telephone number which has been pre-programmed into it which represents the telephone number of the LCP gateway, or an LCP capable terminal. The user listens through the ear piece or speaker of the telephone handset while this is done. It may be desirable to have the output sound generated by the gateway be particularly loud, so that the user does not have to hold the handset very near his ear, to permit access to buttons on the device 10 while listening.

Once the gateway, or LCP capable terminal, answers, the user will hear an audible prompt, in language form, either from a human being or from a machine. The message might say "Send Page" for example. The user then presses the SEND button 24 on the AEDP, and the AEDP 10 then automatically transmits the alphanumeric message entered by the user across the telephone line in LCP format to the device at the other end of the line. If the message is correctly received, as will be discussed further below, the gateway or LCP terminal then provides yet another audible feedback to the user by a message, such as one saying "message received, thank you" or the like.

The AEDP 10 does not operate in accordance with the existing TAP (or other paging system) protocol. The existing paging input protocols all require full duplex communication and a modem-compatible handshake as a part of the initiation of a digital information transmission. Incorporating the capability to receive and decode audible signals, and to conduct an ASCII handshake, would require electronics in an AEDP which would raise its cost to levels significantly higher than are necessary.

Instead, the AEDP 10 transmits in a different code format, an enhanced and altered version of a communications format known as Baudot, which has been previously used almost exclusively in devices known as TDDs, or telecommunication devices for the deaf, also known as text telephones. In conventional Baudot communications, a space is indicated by a tone of 1800 hertz while a mark, or logical one, is indicated by a tone of 1400 hertz. By alternating these two tones, differential bits of a digital message can be transmitted from one station to another. The conventional Baudot protocol and format is a simplex code, which does not require or support duplex communication and which does not require or support machine-to-machine handshaking to initiate a communication.

Here, preferably, one of various enhanced protocols using Baudot tones is used with the inventive AEDPs 10. One enhanced protocol, referred to as Turbo Code, has been described in detail in published PCT patent application WO 93/23947, the disclosure of which is herein incorporated by reference. Turbo code uses the Baudot tones (1400 and 1800 Hz) for the one's and zero's of its digital communications format, but operates at an increased speed over conventional Baudot and uses the ASCII character set rather than the idiosyncratic Baudot character set. Turbo Code does normally require a synchronization process at its initiation, but the AEDP and its protocol modifies that protocol to dispense with any handshaking format since the AEDP is not capable of receiving signals via a telephone line.

However, the AEDP 10 preferably transmits code in the Turbo Code format at an average of about 100 Baud. The use of Baudot tones for information transmission makes use of a communication protocol having a long history of successful use and one which, unlike for example using DTMF tones for information transfer, permits an information string of reasonable length to be transmitted through the telephone in a short time period. For example, a 40 character message can be sent by an AEDP using the Turbo Code protocol in about 6 seconds. The use of the ASCII character set, as opposed to the Baudot character set, allows for the use of conventional and widely available character look-up tables.

The format and protocol used to transmit the message is of importance to the most efficient and most economical functioning of the system in accordance with the present invention. The AEDP system makes use of the Baudot tones 1400 and 1800 Hertz, but uses a conventional ASCII character set, as described above. The Turbo Code message format is as follows:
SYNC, SYNC, ST, USER-ID, FR, SYSTEM-NUMBER, FR, PIN-NUMBER, FR, MESSAGE, FR, CHECK SUM, EOT.

In the above message format, the term "SYNC" refers to a synchronization signal developed for the Turbo Code enhanced Baudot communication protocol which has the effect of informing a Baudot device that a message is being transmitted in the enhanced Baudot code known as Turbo Code. The SYNC character is transmitted twice to identify the packet as being in Turbo Code format and to identify to the receiving equipment the modulation pattern of the signal which follows. The term "ST" refers to a start control character necessary to delimit the start of a variable width field to follow. The character "FR" refers to a frame control character which is again intended to delimit the size of the variable length field which it follows or precedes and thus indicate the bounds of that field. The character "EOT" is an end of text character indicating that the transmission is complete.

The field entitled USER-ID is the identification number of the user or sender. One purpose of this number is to permit the AEDP system to be implemented in a way, if desired, to permit the billing for paging messages sent to the financial responsibility of the sender rather than the recipient. Each of the AEDPs 10 is assigned a unique USER-ID number. When a page is transmitted, the system records the USER-ID number for billing, analogously to billing long-distance telephone charges.

The "SYSTEM-NUMBER" indicates, for a low cost paging gateway the telephone number of the alphanumeric paging system which it is to dial. The message intended for the recipient is indicated at "MESSAGE" in the format above and the "PIN-NUMBER" represents the personal identification number of the recipient to be paged. If the LCP gateway is integrated into an alphanumeric paging system so that the terminal can receive LCP messages, then it becomes desirable to eliminate the SYSTEM-NUMBER from the low cost paging message format. The CHECK-SUM is used to verify that the message packet is correctly transmitted and received. The CHECK-SUM is a running 14 bit addition of the ASCII values for all of the characters in the entire message packet following the initial ST character and through the FR character ending the message field. The receiving LCP gateway or terminal would always keep a running sum of the data as it is received so that it can compare that sum to the bytes in the CHECK-SUM location of the message stream. If the running CHECK-SUM does not match the received CHECK-SUM field transmitted by the LCP paging device, the LCP gateway or terminal would be programmed to automatically request re-transmission of the message packet, because an error in transmission or reception has thus occurred.

A second enhanced protocol, referred to as Turbo Code II or TCII may also be used instead of the conventional Baudot protocol. TCII, like Turbo Code, uses Baudot tones for the ones and zeros of its digital communications format, uses the ASCII character set and dispenses with the handshaking format. However, TCII transmits information at an even higher speed than Turbo Code, and uses an 8-bit ASCII format instead of the 7-bit ASCII format. In Turbo Code format, each character transmission requires one start bit, seven data bits, and two stop bits. Hardware used to produce TCII receivers will only need a single stop bit to correctly identify the end of a character transmission. Thus, in TCII format, eight data bits can be used to identify each character transmission. This is advantageous because it allows for additional characters which means AEDPs can be used with languages having large character sets and for transmitting graphics or the like.

To increase the transmission rate, TCII uses an abbreviated modulation protocol for transmitting marks and spaces. As does Turbo Code, TCII continues to use 1800 herz signals for spaces and 1400 herz signals for marks. However, in TCII, the time for a space bit and the time for a mark bit are reduced and are equal to 5 cycles. By doing this, the Baud rate of transmission increases approximately three-fold over Turbo Code transmissions (i.e. from 100 to 300 Baud).

In addition, the present invention is particularly useful with a flexible message format as follows:
SYNC(TCII), ST, LCP-IN, USER-ID, FR, FIELD1,
FR, FIELD2, FR, . . . FIELDn, FR, CHECKSUM, EOT.

In this flexible format, signals which are identical to signals in the Turbo Code format generally serve the same function and therefore will not be described here again in detail. The flexible format begins with a special Turbo Code II Sync signal. The "SYNC(TCII)" signal is a synchronization signal developed for the TCII enhanced communication protocol which has the effect of informing a receiving Baudot device that a message is being transmitted in the enhanced TCII Baudot code. While the flexible format identified above is explained in conjunction with the TCII transmission protocol, the flexible format can be used with any type of transmission and in particular with any Baudot coded transmission.

The flexible message format above also includes a special format field "LCP-IN". The LCP-IN field is intended to allow users to identify a plurality of different message formats and to facilitate various useful AEDP functionalities. The present inventors have realized that an AEDP 10 can provide various enhanced functions in addition to simple message sending and receiving. Certain various functional attributes of the inventive AEDP which are facilitated via the LCP-IN field are identified below. The LCP-IN field anticipates that in the future there will be additional AEDP applications which can be designated within this field that have not, as of yet, been identified. Fields FIELD1, FIELD2, . . . FIELDn are variable fields which may be filled with various different types of information including a page message, system numbers, pin numbers, information on how an LCP-IN specified function should be carried out, etc. For example, where the function specified in the LCP-IN field is a simple "page" function, the variable fields FIELD1–FIELDn would include MESSAGE, SYSTEM-NUMBER, and PIN-NUMBER fields as described above in reference to the Turbo Code protocol. On the other hand, where the LCP-IN field specifies a function requiring information to be sent back to the message sender (e.g., a response or memory update information), the variable fields may also include system and pin number fields identifying the message sender, thus facilitating return of information.

Figure 5B:
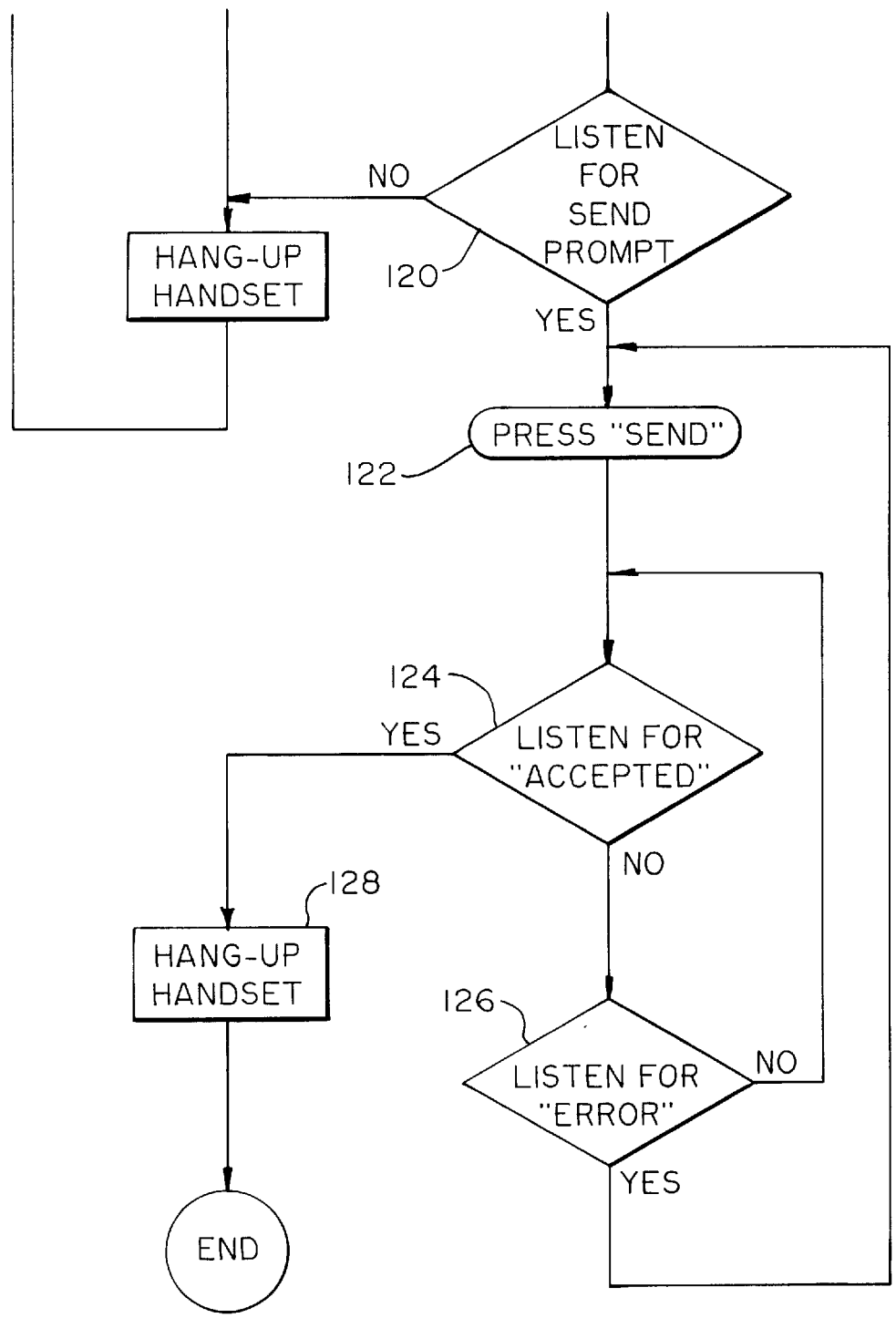
FIG. 5 is a flow chart illustrating the operation, from the user's point of view, of the device of FIG. 1.

FIG. 5 illustrates a flow chart of how an alphanumeric message can be entered and sent using an AEDP 10. The start of the flow chart, representing the rest state of the device, is indicated at 100. Referring also to FIG. 1, to initiate a paging operation, the user presses the PAGE button 20 on the front face of the device 10. This step is indicated at 102. Next, the user is prompted by a display generated on the alphanumeric display 12 to enter the name of the recipient to be paged. The user types the name of the recipient, and presses the ENTER button 18 on the front of the device, to indicate that process is completed, as indicated at method step 106. In method step 108 the user types the message that he or she desires to send. When the user has completed formulating the message to be sent, the user presses ENTER again, as indicated at method step 110. Next, as indicated at method step 112, the user picks up the telephone handset and, as indicated at method step 114, listens for the usual audible dial tone. Obviously, if there is no dial tone, the user hangs up the handset and looks for another telephone. If a dial tone is received, the user places the AEDP 10 over the mouthpiece of the telephone, as indicated at method step 116 in FIG. 5.

Then, at method step 118, the user presses the DIAL button 22. The AEDP 10 then uses DTMF tones to automatically dial the gateway to prepare for message transmission. The gateway is programmed to, once a telephone connection is made, send a verbal acknowledgment or human audible tone to the user indicating that the message may be transmitted. At method step 120, the user listens for the prompt from the system to send the message. When the user has received the prompt, the user, at method step 122, simply presses the SEND button 24. This causes the AEDP 10 to automatically format and transmit the message, as a stream of Baudot tones, out the speaker 24 into the mouthpiece of the telephone. The tone stream is transmitted over the telephone connection to the remote LCP gateway or LCP terminal. The remote gateway or terminal checks for authorization of the USER-ID, and also analyzes the message and the CHECK-SUM at the end of it to verify that no information has been lost in the transmission process. If the user is authorized, the message is successfully received, and the CHECK-SUMs match, the gateway or terminal sends a verbal message or a human audible tone to the user. Thus, at method step 124, the user listens to determine whether or not the accepted message has been sent by the gateway or terminal. If the accepted message is not received, the user listens for the error message at 126 which would inform the user to re-initiate sending of the message. When a successful send acknowledgment is received at method step 124, the user then hangs up the handset to complete the interaction as indicated at method step 128.

Figure 6A:
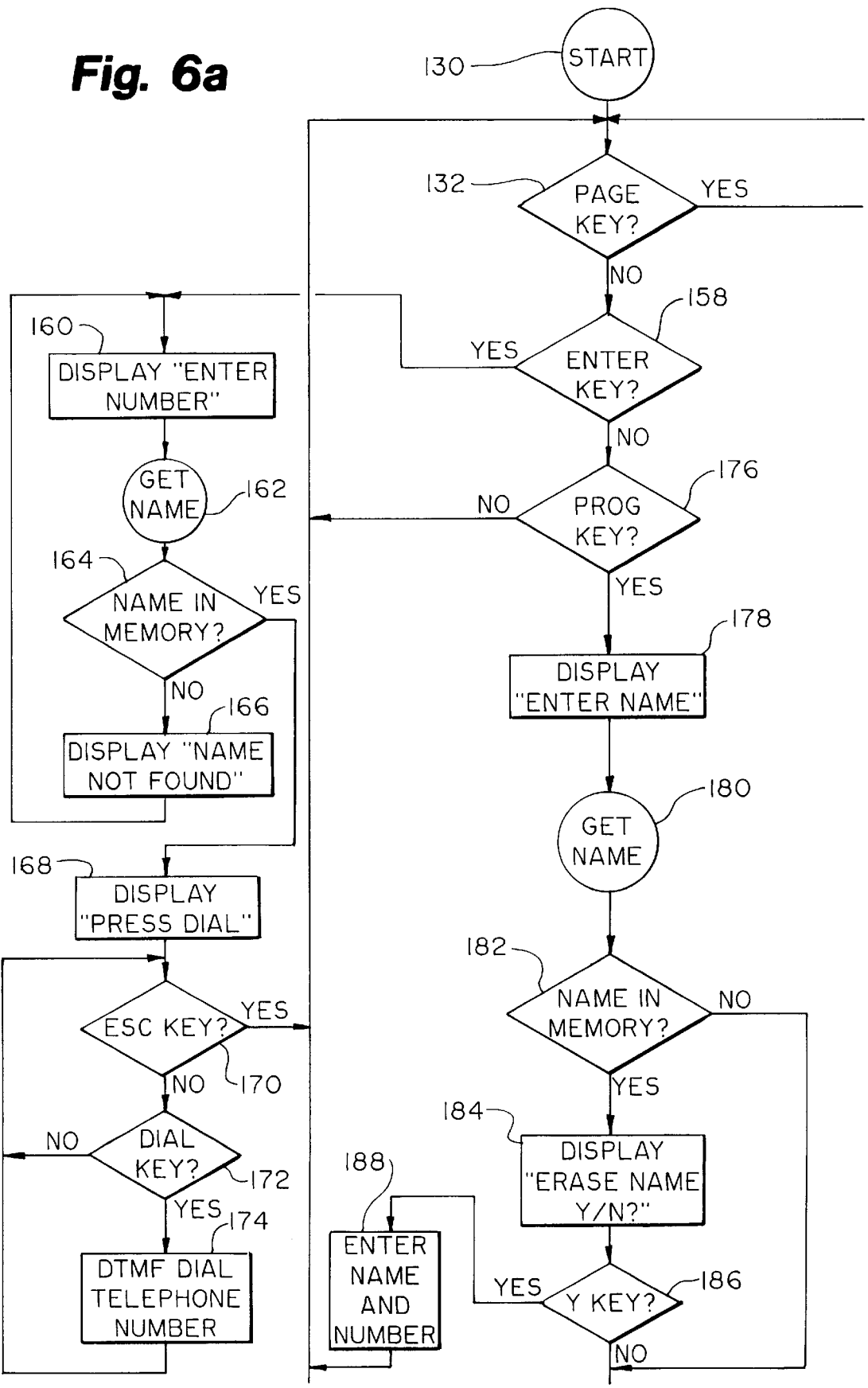
FIG. 6 is a flow chart illustrating the operation of the device of FIG. 1, from the device's perspective.
Figure 6B:
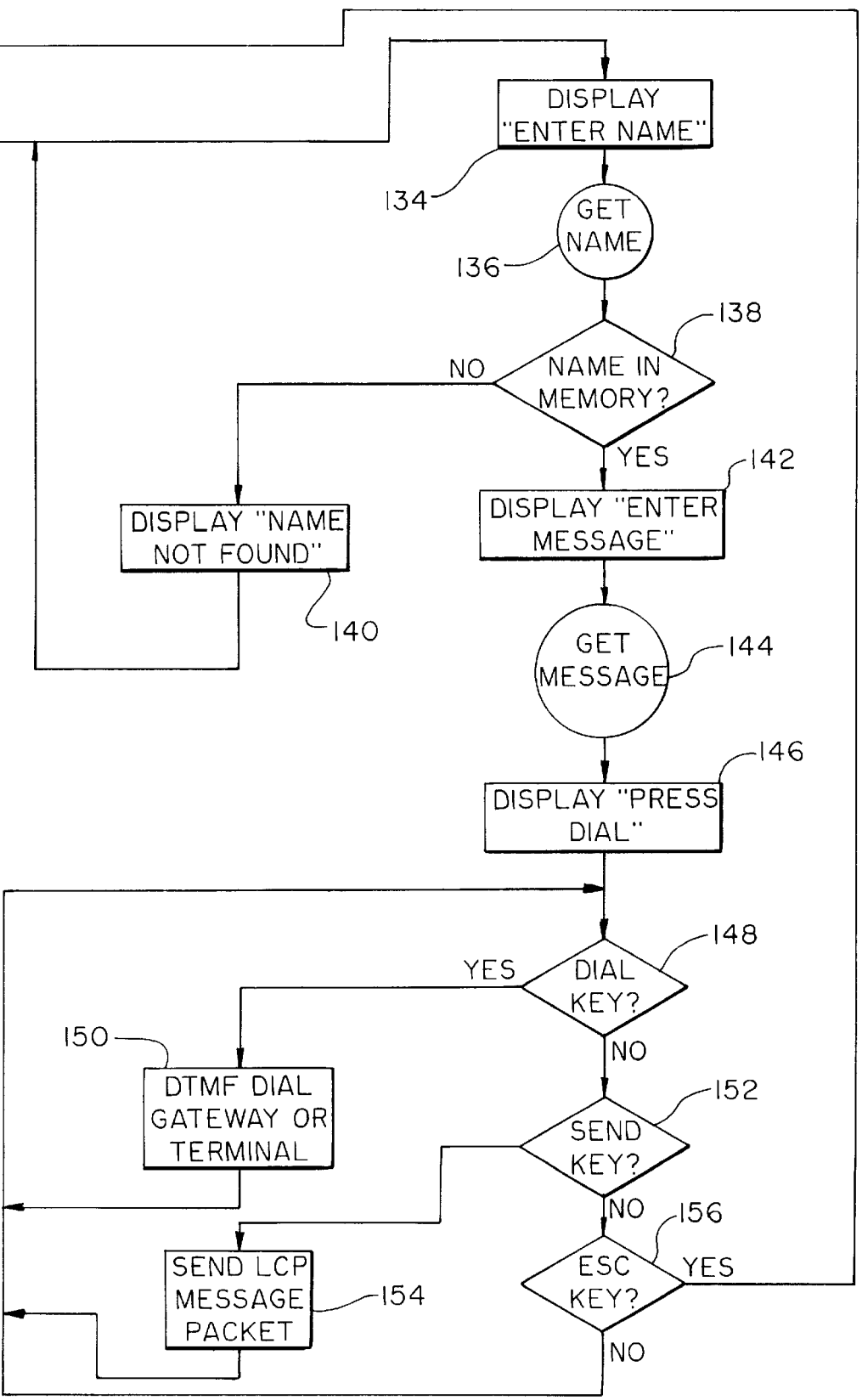
Figure 6C:
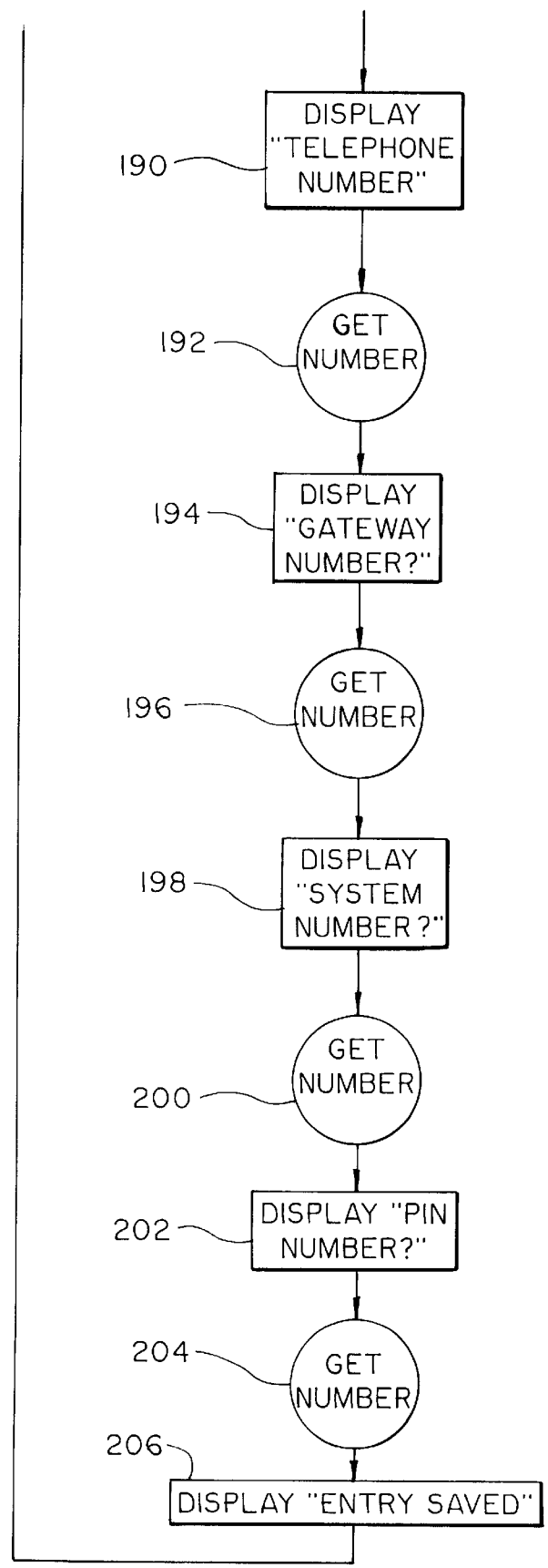
Figure 6:
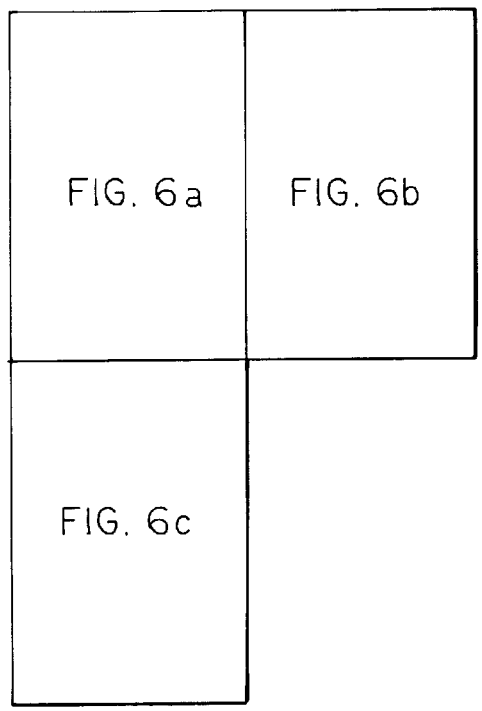

Illustrated in FIG. 6 is a flow chart of the operation of the AEDP 10 itself. The start in this flow chart is indicated at 130. Operation of the AEDP 10 is initiated by the user pressing one of the keys. The four possible initiating keys are the PROG key, the ENTER key, the PAGE key, and the RESP key. They will be discussed in order.

Since the AEDP 10 incorporates a memory to automate certain of its functions, it is advantageous to provide a procedure for the user to program the device with the telephone and PIN numbers which the user will use. This procedure begins when the user presses the PROG (program) button 16, as indicated at method step 176. Following that action, the device, at method step 178, prompts the user to enter the name of the recipient to be entered into the memory. The user, at step 180, enters the name of the intended recipient into the device using the keyboard. The device checks, at method step 182, to see if the name has already been entered into its memory. If the answer is "Yes," the device then interrogates the user as to whether or not it is intended that the prior information for a recipient of that name be erased, as indicated at step 184. If the user presses the "Y" key, a query step indicated at 186, indicating that the number is to be erased, the procedure branches to step 188 where information about the name and number is erased, after which the system returns to the start state.

If the user indicates no by pressing the "IN" key in step 186 or if the name was not in memory at step 182, then the device displays a prompt asking the user to input a telephone number for the recipient at step 190. This telephone number is the personal telephone number of the recipient for auto-dialing purposes. The user inputs the telephone number into the device at step 192. Then the device, at step 194, prompts the user for the number of the LCP gateway, followed by the user, at step 196, entering the number into the keyboard. If the user is a subscriber of a system which does not use a gateway, but includes terminals capable of directly receiving LCP format input, then the user presses a key to indicated that no gateway number is to be used. Then at step 198, the device prompts the user for the telephone number of the terminal for the paging system to which the recipient is a subscriber, followed by the user, at step 200, entering the telephone number of the paging terminal into the device. The device then, at step 202, prompts the user to type in the PIN number of the intended recipient, and the user inputs that particular number at step 206, after which the device returns to its beginning state.

The AEDP 10 can also be used as a simple telephone dialer. Since the device has the capability to generate DTMF tones for the purpose of automatically dialing the paging gateway or terminal and also has the capability to remember telephone numbers in its memory, the device can easily be programmed to use this facility to also serve as an auto-dialer. To utilize this option, the user presses the ENTER button 22, as indicated at method step 158. At step 160, the device 10 responds by displaying a prompt for the user, such as "Enter Name," to prompt the user to enter the name or code number of the intended recipient. At method step 162, the device retrieves the name from its memory. If the retrieval is unsuccessful, then at method step 164, the device displays a notice to the user that the name could not be found (step 166), and then the operation returns to the user prompt at 160. If the memory successfully retrieves the recipient's telephone number from its memory, the device then displays a prompt to the user, at step 168, inviting the user to press the dial button which, in this case, will initiate the dial only. The user then places the speaker of the device over the handset of the telephone. Unless the user presses the escape key (ESC) at step 170 and after the user presses the DIAL button (step 172), the device then generates the DTMF tones to dial the telephone number of the intended recipient of the telephone call, as illustrated at step 174.

If the user presses the PAGE key, as indicated at step 132, the AEDP 10 then generates a prompt on the alphanumeric display 12 which indicates to the user to enter the name of the intended recipient of the page, this being indicated by method step 134. At data input step 136, the user types in the name of the designated recipient. At method step 138, the AEDP examines to see whether or not the name of that individual matches a name stored in the RAM 39. Since initiation of a paging function with the PAGE key is only intended to be effective if the name is found in the memory, if the answer at method step 138 is no, the system will make a display, indicated at 140, indicating that the name was not found and ask for a new name to be entered.

If the name is found in the memory, then the AEDP generates a prompt, indicated at method step 142, asking the user to input the message. At step 144 the user types the message into the device. At method step 146, the AEDP prompts the user, following the end of the message, to "Press Dial" indicating that the user is to place the device in the telephone handset and press the dial button 22. When the user presses the dial button, as indicated at method step 148, the AEDP uses the DTMF tones to dial the gateway or terminal using the number which has been previously programmed into its memory. The device then waits for the user to press the send key, as indicated at method step 152. When the user presses the send key indicated at method step 152, the system, as indicated at method step 154, formats and sends the LCP message packet to the gateway or terminal. The system then waits until the user presses the escape key, indicated at method step 156, before returning to its start status.

The USER-ID function is not intended to be altered by the user. It is intended to be a permanent identification number assigned to the device that is associated by the LCP system with an identified user having a page sending account.

The Gateway

Figure 7:
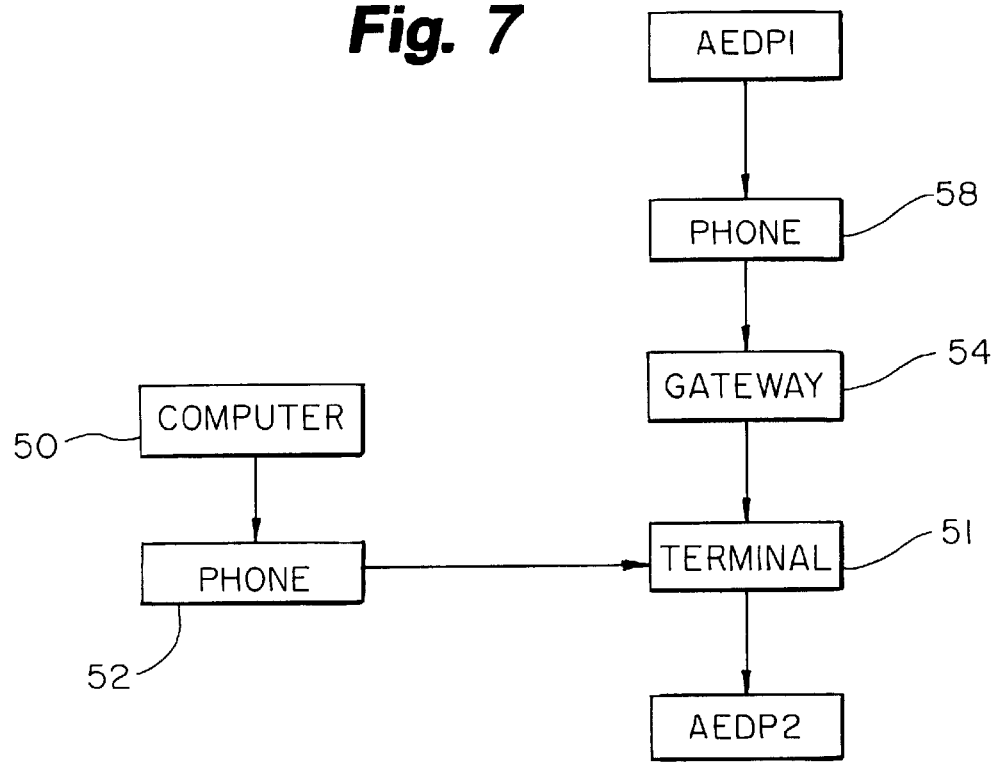
FIG. 7 is a schematic illustration illustrating the role of the gateway device.

At the other end of the telephone line, the LCP gateway or LCP terminal must be configured to provide the needed prompts to the user, to accept LCP messages from the AEDP and to convert those messages into conventional TAP signals for the paging system. Referring to FIG. 7, in a conventional alphanumeric entry system, a user uses a computer 50 or modem capable device to dial a terminal 51 by telephone 52 and the message is sent to the terminal 51 in TAP, or other paging protocol, format.

The AEDP system generally consists of a plurality of different AEDP units AEDP1, AEDP2, an LCP gateway 54, a terminal 51, and a conventional phone system represented by phone block 58. After AEDP1 has been used to enter an alphanumeric message, AEDP1 and a phone 58 are used together to dial the gateway 54. The gateway 54 is programmed to provide appropriate prompts to the user so that the user operates the device to send an LCP message packet. The gateway 54, which is modem capable, then reformats the message and transmits the message in the appropriate conventional paging input format, (e.g. TAP), to the terminal 51 of a paging system. It is for this function that the device transmits the SYSTEM-NUMBER in the LCP message format, so that the same LCP gateway can be used with a number of different conventional paging systems. The SYSTEM-NUMBER tells the gateway which of the terminals to dial.

Figure 8A:
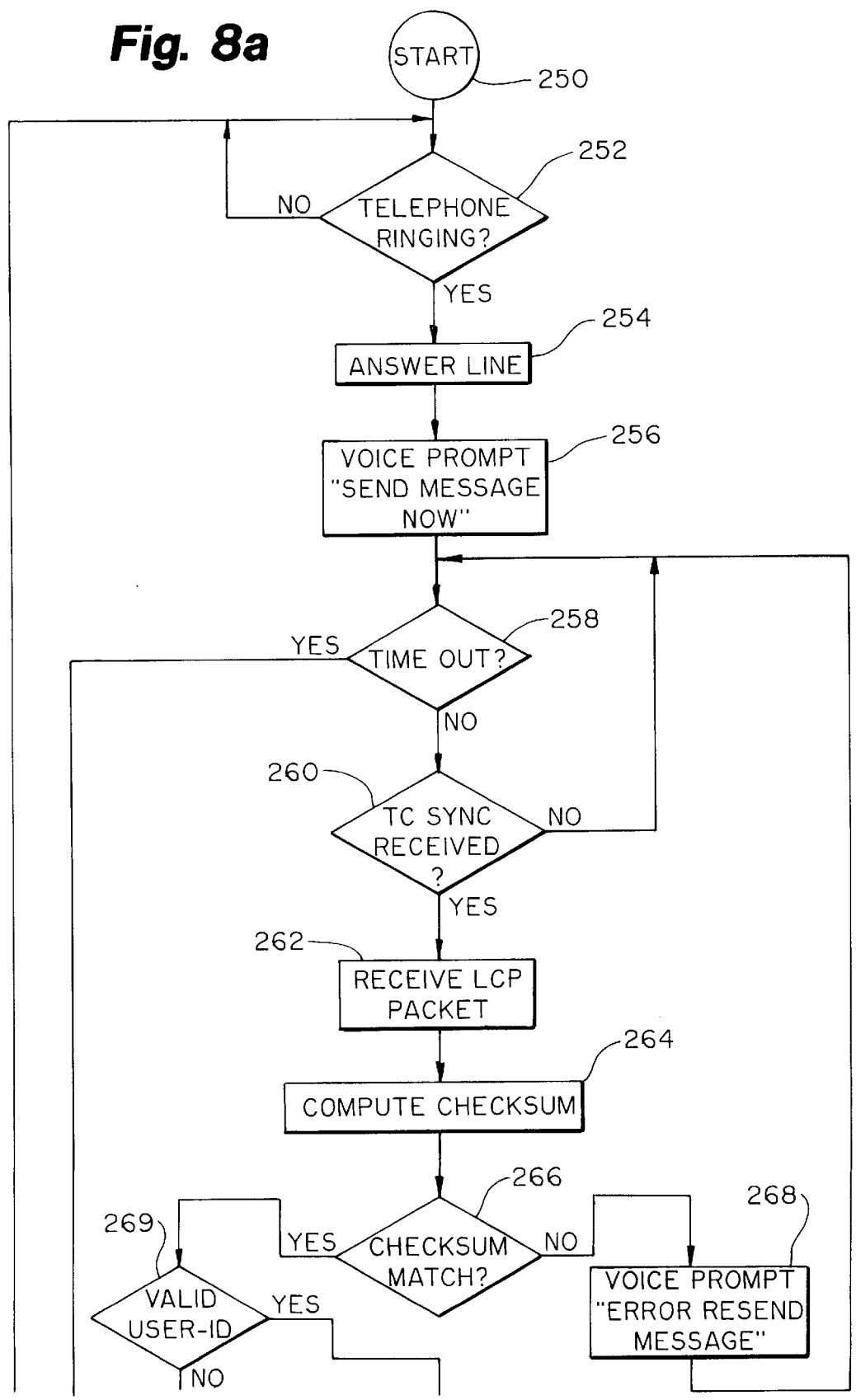
FIG. 8 is a flow-chart illustrating the operation of the gateway device.
Figure 8B:
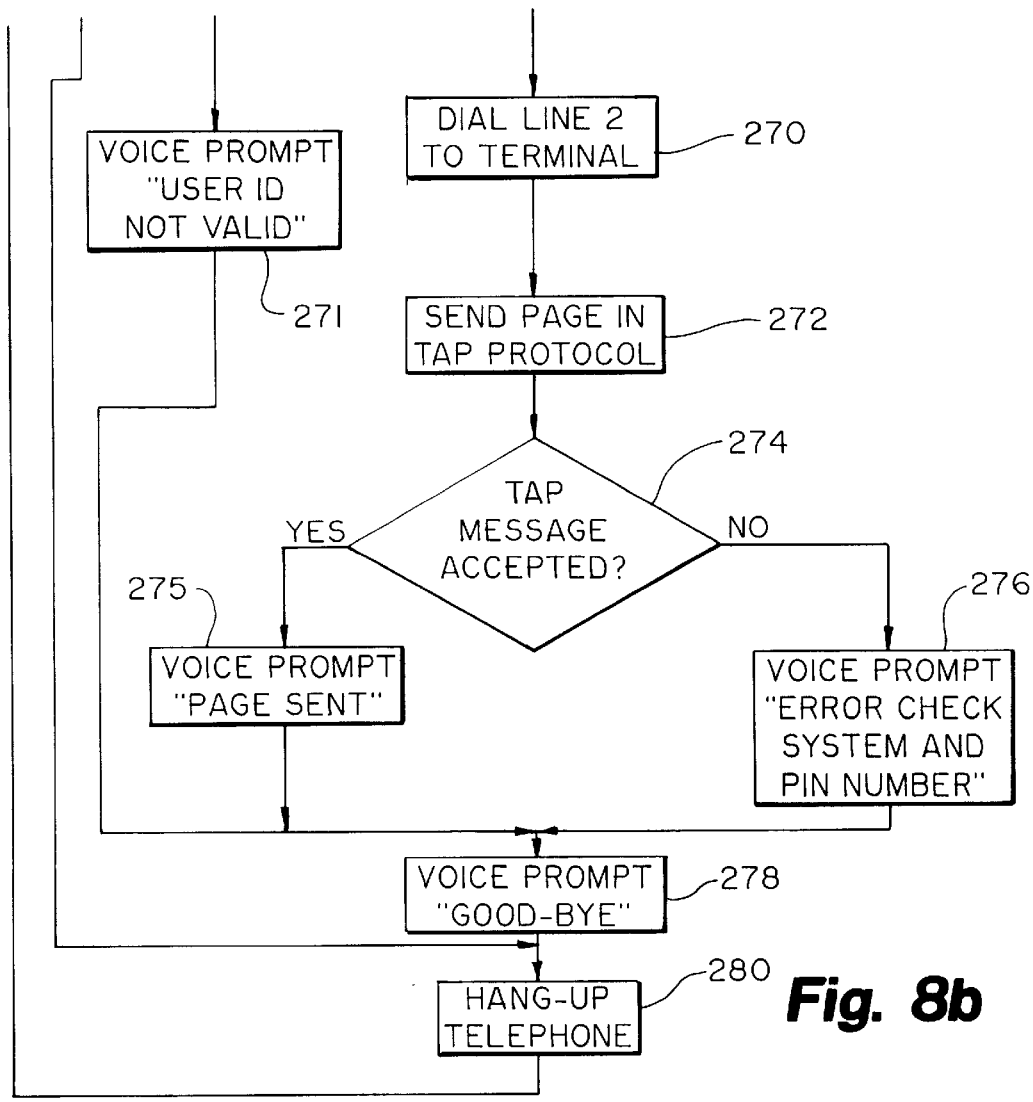
Figure 8:
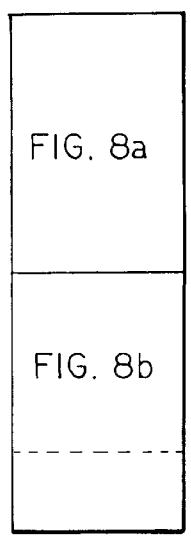

Shown in FIG. 8 is a flow chart illustrating the method of operation of the LCP gateway device. The flow chart starts at step 250, and in step 252, the gateway waits for the rings of its input telephone. In step 254, after the telephone rings, the gateway answers the line. The gateway then, at step 256, generates the verbal voice prompt or other human audible tone sent out over the telephone line to the user. As step 258, the gateway then waits for input tones to be received, and ultimately time out if the input of an LCP message is not forthcoming. In step 260, the gateway listens for the input SYNC signal indicating the start of an LCP message. If a SYNC signal message is not received, the gateway times out and resets. If a SYNC character corresponding to a recognized LCP format is received, the gateway then receives the message packet, as indicated at 262.

The gateway computes the a checksum as the message is received (step 264) using the same algorithm as the AEDP 10, and the calculated checksum is compared to the CHECK-SUM portion of the LCP message packet at step 266 to see if they match. If a match is not made, the gateway provides a human audible announcement to the user that an error was made, as indicated at 268, and restarts the message transmission process. If a match is made, the gateway then checks the USER-ID in the message packet, at step 269, to verify that the sender has an account and to record the user's identification for later billing purposes. If the USER-ID is not authorized, the gateway, as indicated at step 217, sends the user a verbal message or human audible tone to that effect and terminates the call. If the user is authorized, the gateway then dials out on its other telephone line to dial the terminal of the paging system indicated in the LCP packet, this being represented at 270. The gateway then sends the message to the terminal in the conventional paging format of the terminal, such as TAP, as indicated at 272. If the transmission to the terminal is successful, the gateway presents a human audible tone to the user indicating that the message was successfully sent in step 274. If the message is not accepted by the terminal, the gateway informs the user of an error, as indicated at 276. The gateway then gives a departure sign-off at 278 and hangs up at 280 to return to its start state.

Paging Functionality

In addition to initiating alphanumeric pages, the present AEDP 10 is equipped to function as an alphanumeric page receiving device. Referring again to FIG. 7, after a terminal 51 accepts a page message from the gateway 54, the terminal 51 transmits a radio frequency message 60 in TAP to all of the AEDPs associated with the paging system.

Figure 9:
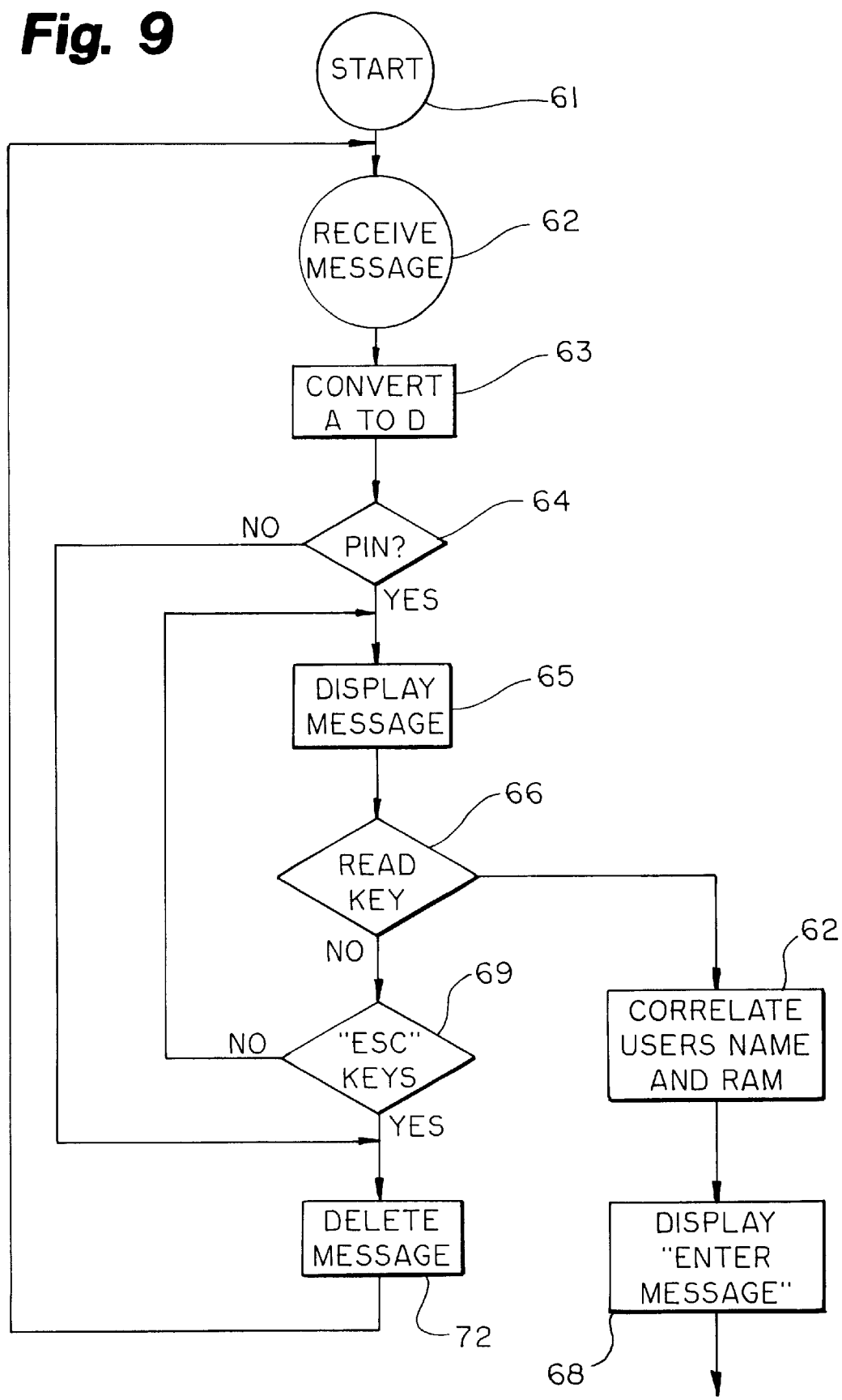
FIG. 9 is a flow-chart illustrating the operation of the inventive device when a page is received.

Referring now to FIG. 9, the paging functionality of an AEDP 10 is illustrated beginning at block 61. Referring also to FIG. 3, an analog radio frequency message is received at 62 and is demodulated at 63. The AEDP microprocessor 30 isolates the address portion of the message and compares the address portion to an address previously assigned to the particular AEDP at 64. If the addresses are different, the microprocessor 30 deletes the message at 72 and returns to its starting state.

Where the addresses are identical, however, the microprocessor 30 supplies the digital signal to the display driver 38 which generates the message at 65 displaying the received message on display 12. In addition, the microprocessor 30 may provide a notice pulse through connector 35 to driver 36 that generates an audible notice sound through speaker 26 indicating that a page has been received. The received message remains displayed until purposefully deleted or removed as described in more detail below.

Thus, as can best be appreciated from a review of FIG. 4, both alphanumeric entry and page receiving capabilities can be implemented using the same hardware. This hardware sharing minimizes the costs associated with an elaborate "two way" alphanumeric paging system where an entry device is separate from a page receiving device.

AEDP Synergies

In addition to reducing hardware costs, the present AEDP also provides various other advantages and system enhancements that cannot be easily realized where separate devices are required for data entry and page reception.

One enhancement enables a page recipient to quickly respond to a received message. Where a page message includes a character string which can be identified by a receiving AEDP as indicating a response is required and the received message is from a system user having address information stored in the receiving AEDP's RAM, a receiving AEDP can determine sending AEDP address information automatically and can eliminate the need to identify the intended response recipient.

For example, at the end of a message field in either the Turbo Code or the TCII formatted message packet, a sender may include an @ sign followed by the senders name. In this case, where the @ sign is recognized as a response required flag by a receiving AEDP, the receiving AEDP can automatically use the sender's name at the end of the received message to identify sender address information, including the sender's system and PIN numbers. Once the address information is identified, the AEDP use that information to quickly direct a response message back to the original sender.

Referring again to FIGS. 1 and 9, a received message is displayed at 65 until either the RESP (response) key 75 or the ESC (escape) key is struck. Where ESC is struck at 69, the message on display 12 is deleted and the AEDP returns to the start state. Where the RESP key 75 is selected at 66 indicating that the recipient wishes to respond, a sender's name which is at the end of the received message following the @ sign, is correlated with the receiving AEDP RAM address information at 67, thus selecting the original sender as the intended response recipient. Then, at 68, the message "Enter Response" is displayed on display 12. From this point on, the response process follows the flow chart of FIG. 6 beginning at block 144 where the responding AEDP gets the response message.

Figure 10:
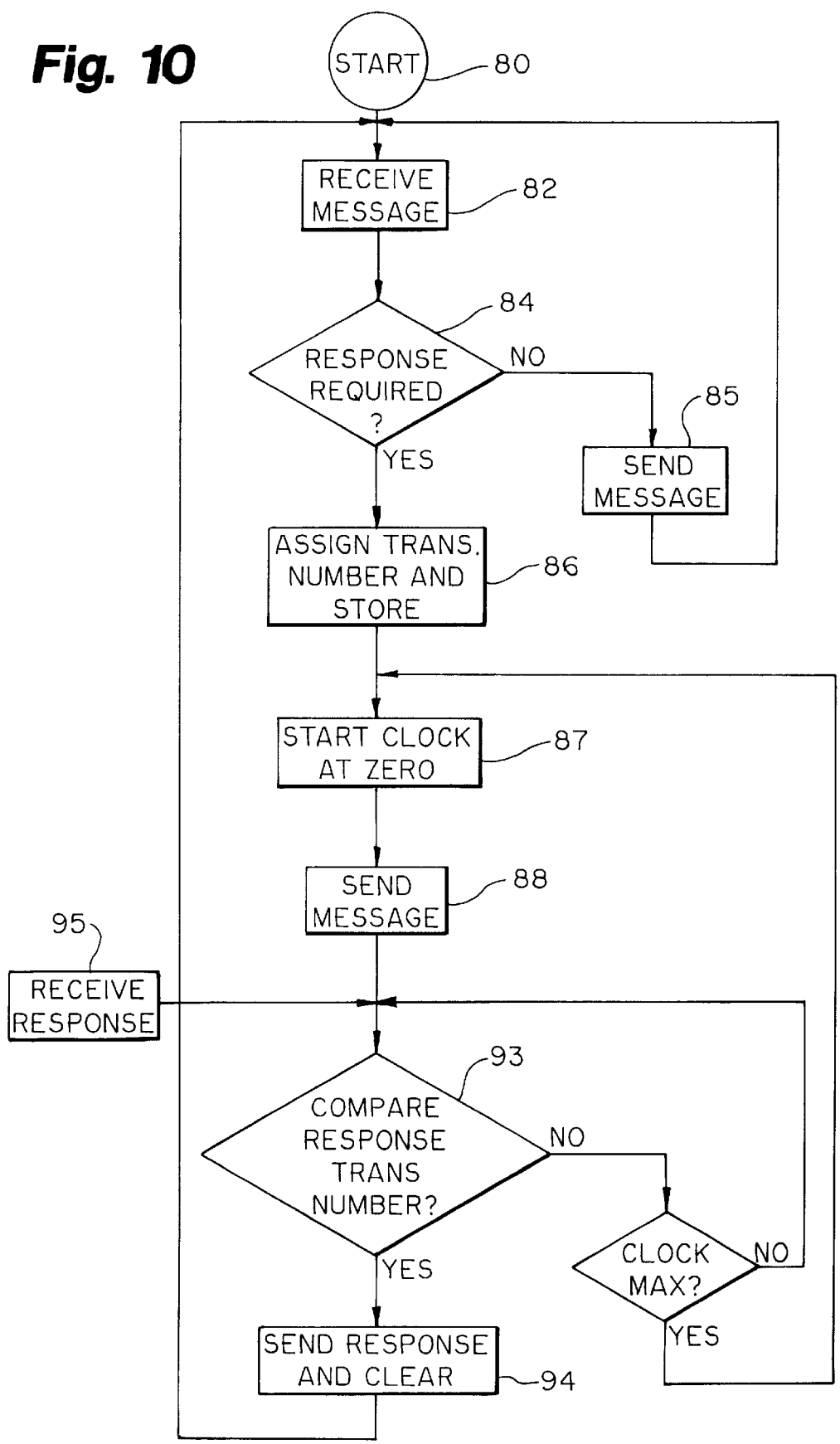
FIG. 10 is a flow-chart indicating a special operation of a gateway according to the present invention.

Yet another AEDP enhancement is that a sender can require a response and a properly programmed gateway can track the response. For example, a message may inquire "Did you take your pill yet?", to which the sender would like at least a "YES" or "NO" answer. Where a message sender requires a response from a recipient, the AEDP can be used to demand a response within a predetermined period. The AEDP 10 can be used to indicated to a gateway that, where no response is forthcoming, some other action should be taken. Thus, where the predetermined period passes without response, the gateway may be instructed to either retransmit the original message automatically, notify the sender via the senders AEDP, or both retransmit to the recipient and notify the sender.

Where a response is required, the LCP-IN field will identify the required functionality and will also indicate to a receiving gateway that information required to complete a response is included in following fields. Thus, a message packet requiring a response will include fields identifying the telephone number for the gateway used by the sender, the sender's system number, and the sender's pin number.

Where a response is required, a gateway may follow the method detailed in FIG. 10 which starts at block 80. At 82, the gateway receives a message from a sending AEDP. At 84 the gateway interrogates the LCP-IN field to determine if the sender requires a response. If no response is required, the gateway sends the message (via a terminal as described above) to the intended receiving AEDP at 85. However, where a response is required, the gateway first assigns a transaction number to and stores the entire message at 86 and then starts a message clock at 87 associated with the stored message. Next, at 88, the gateway transmits the message to the intended recipient including flags recognizable by a receiving AEDP as delimiting different parts of the message, two of the parts indicating the transaction number associated with the sender's message and the gateway used by the sender (e.g. the gateways telephone number). In this case, one flag may be a double arrow (i.e. ^^) while the other flag is a double ampersand (i.e. **).

The receiving AEDP should be programmed to recognize the flags and separate the different parts of the message. The receiving AEDP stores the transaction number and gateway identifying information in RAM, displays the message, and indicates that a response is required. Where a response is required, the receiving AEDP can display the message "Response Required" after the sender's message.

When a response is returned by the responding AEDP, the responding AEDP sends the response via the gateway identified in RAM and used by the sender. While the gateway used by the sender may be different than the gateway normally used by the responding AEDP, the sender's gateway is always used where a response is required so that the response can be correlated with the transaction number associated with the original message.

The response message includes another LCP-IN field identifying that the message is a response. A response message also includes the transaction number associated with the original message. The gateway receives the response at 95 and identifies the message as a response by interrogating the LCP-IN field. The transaction number field within the response is then interrogated and is compared to the transaction number assigned to stored messages in the gateway RAM at 93. If a response having a transaction number identical to a stored message is received prior to the occurrence of a maximum clock value associated with that transaction number, the gateway transmits the sender's response as described above to the user that required the response via the sender's system and PIN numbers and also clears the message and any associated information (e.g. the clock, transaction number, system and pin numbers) from its memory at 94.

However, the gateway continually tracks the maximum clock value at 95 and if the gateway does not receive a response associated with a message having a specific transaction number within the maximum clock time, the gateway loops back up to block 87 where the clock is reset to zero and begins to count again. The message is retransmitted at 88. This process continues until a response has been transmitted.

In the alternative, the LCP-IN field could identify a function wherein, if a response is not forthcoming in the maximum clock period, the gateway notifies the original message sender that no response was made. Clearly other variations are also possible.

The AEDP 10 may also be used to simply confirm that a message has been transmitted to an intended recipient. During certain times, a gateway may be inundated with page messages which will have to be queued in a stored buffer to be processed in due course. Thus, message transmission from a gateway to a paging terminal may be delayed during a brief queuing period. Where a message is particularly important, the sender may require a confirmation page indicating when the message has been transmitted. Again, as in the case where a response is required, the gateway can assign a transaction number to a received message requiring a confirmation. After the message is transmitted to a terminal for paging the gateway can generate a confirmation page wherein the recipient is the original sending AEDP, the confirmation page indicating that the original page has been sent.

In addition, the AEDP 10 may be used to update address information in an AEDP RAM. Where a plurality of AEDP users require the same AEDP addresses, a master AEDP may be used to alter all AEDP addressed stored in AEDP RAMs. For example, where 40 sales representatives each require the AEDP addresses of their associate representatives and associate representatives are regularly added to, and deleted from, a sales team, instead of requiring each representative to alter AEDP RAM addresses each time the sales force is changed, a single master AEDP may be used to send updated address information to all of the representative's AEDPs, each message including a flag recognizable by the receiving AEDPs indicating that the information included is update address information. Once recognized as update information, the AEDP's could be programmed to update their respective RAMs by storing the received information.

Moreover, an AEDP could be used to request billing information from a gateway. In this case, rather than send a page to another AEDP, the gateway could access billing information for the requesting sender. When such a request is made, the gateway could access a billing buffer, identify the requesting AEDP via a USER-ID field, and then send the information back to the requesting AEDP via a page.

Yet another function of the AEDP could be to access a huge data base of addresses corresponding to other AEDPs via the gateway. A message could include the name of a person the sender wishes to contact and instruct the gateway to identify the indicated person's AEDP address. After identifying the address, the gateway could send the address to the requesting AEDP via a page. The requesting AEDP would receive the address information which could then be used to transmit a message to the indicated person.

While only a small number of useful AEDP functions have been identified at this time, it is envisioned that there will be many hundreds of different functions in the future, each function tailored to specific business and user needs.

As indicated above, the LCP-IN field is intended to be used to identify characteristics of a transmitted message which follows, including the format of a message, coded instructions when required to carry out a desired function, and other information which may also be required to carry out a desired function. Thus, referring to the flexible message format identified above, the formats identified here represent only a few of many hundreds of formats which could be used to communicate using an AEDP. Additional fields could be included to identify other user information such as a user fax number, additional AEDP addresses, a predetermined period for retransmitting a message where a response is required, and the like.

Other Embodiments

Referring now to FIG. 11, a second embodiment of the inventive AEDP 37 is of a simpler construction than the first embodiment, having a reduced number of input keys so that the AEDP 37 can be manufactured using nearly identical hardware to that required for a conventional pager. In this embodiment, AEDP 37 includes a display 40, a toggle button 41, and three command buttons labeled "PROG/DIAL" 42, "ENTER/SEND" 43, and "PAGE/RESP" 44, respectively.

Referring also to FIG. 12, the reverse side of the second embodiment can be observed. On the reverse it side, the second embodiment includes a speaker 45 and a radio frequency receiver 46. The speaker 45, receiver 46, and display 40 work in a manner similar to that described above with respect to the first embodiment. The four buttons 41–44 operate together to provide functionality similar to that provided by the keypad 14 and special buttons above. In this embodiment, the display 40 is split into two separate portions, a first message screen 40a at the top of the display 40 and a second scrolling screen 40b therebelow.

With this embodiment, to enter a alphanumeric page, a user would strike the PAGE/RESP button 44 at which point the AEDP 37 would list recipient AEDP address information on the scrolling portion 40b of the display 40. The user would chose an intended recipient by scrolling through the address information using toggle button 41. When the desired address information appears on the screen 40, the user would press the enter button to select the recipient. In the alternative, the user could simply enter the name of an identified recipient and the AEDP could locate the intended recipient's address information in RAM.

Next, the AEDP would prompt the user to input a message on the message screen 40a and would provide alphanumeric and numeric selection data on the scrolling screen 40b. The user could then use toggle button 41 to scroll through the characters provided on the scrolling screen 40b, selecting appropriate characters to form a desired message. A character could be selected by striking the ENTER/SEND button 42. As a character is selected, the character would be provided in the order selected within the message screen 40a.

After a message has been completely entered, the user would locate a telephone, and, as described above with respect to the first embodiment, after checking for the appropriate tone signal on the handset, place the speaker 45 next to the mouth piece of the handset and hit the PROG/DIAL button 42. As explained above, AEDP 37 would dial a gateway or terminal at which point the gateway would indicate to the user via the handset that connection had been made and the message could be sent. At that point the user would strike the ENTER/SEND button 43 transmitting the message to the intended recipient.

All functionality described above with respect to the first embodiment could be realized with this second embodiment. The second embodiment of the AEDP 37 could be used to program the AEDP RAM and to dial phone numbers stored within the RAM by striking appropriate keys 42, 43. While the second embodiment would be more cumbersome to use than the first, the second embodiment would likely be less expensive to manufacture as conventional pager keyboards could be used and less complex connections would be required.

Figure 13:
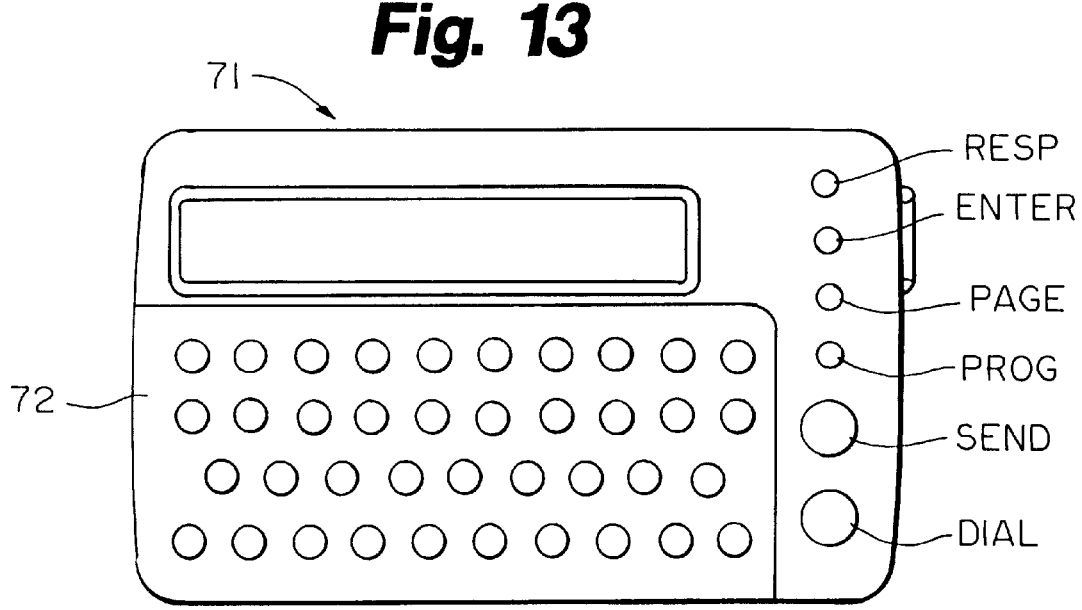
FIG. 13 is a rear plan view of a third embodiment of the alphanumeric paging device constructed in accordance with the present invention.
Figure 14:
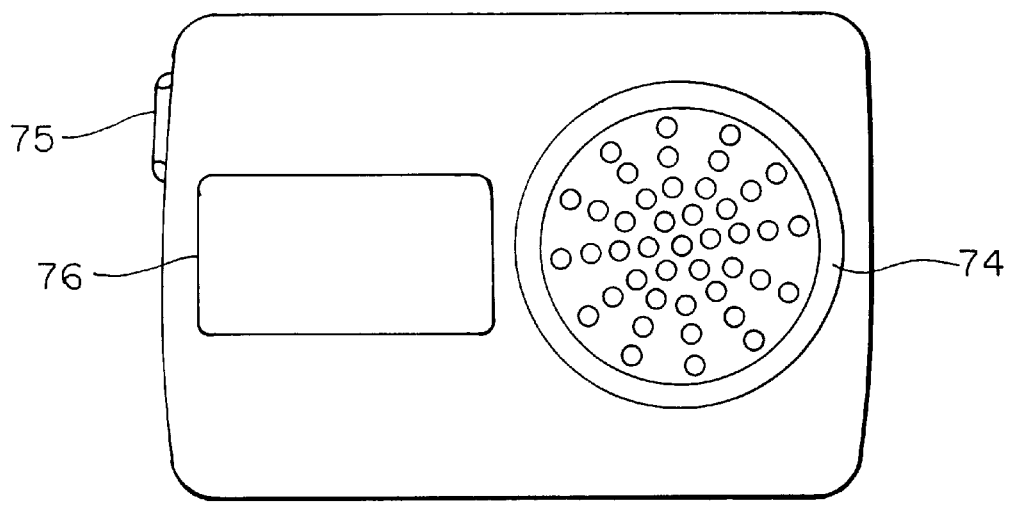
FIG. 14 is a side view of the device of FIG. 13.

Referring now to FIGS. 13 and 14, a third embodiment of the present invention 71 can be observed. This embodiment is similar to the first embodiment in that it includes a full key board 72, a display 73, SEND, DIAL, PROG, ENTER, PAGE, and RESP buttons on a front surface and a speaker 74 and receiver 75 on a back surface. This embodiment is different, however, because it implements all of the functionality of the first embodiment in a device which is approximately the size of a conventional pager and it includes a clip 76 extending from its back surface as it is intended to be carried like a pager, on a belt or the like.

Note that there are several features of the AEDP 10 which permit it to be manufactured and sold as a low cost device while still being capable of efficiently sending and receiving alphanumeric messages. The fact that the device uses Baudot tones and the LCP message format avoid the use of computer-compatible modem circuits. In addition, the fact that the output tones are relatively low-frequency audible tones (1400 and 1800 Hertz), makes it possible for the microprocessor 30 to actually generate the tones directly from its internal programming, without requiring an external tone generator or circuitry. Minimal external circuitry is required to generate acceptable DTMF tones. The microprocessor can be programmed to first generate the DTMF tones for the dialing operation followed by the Baudot tones for the LCP message. The device works with any telephone, and thus can be operated from any location, but is not physically coupled to the telephone and so does not involve the governmental regulatory role involved when devices are wired into the telephone system. While, as an alternative, the DTMF tones could also be used to send the LCP message, use of those tones is inherently less efficient and slower than the use of the Turbo Code or TCII protocol. Since a handshake is not required, the time delay of a handshake, an annoyance to the user, is avoided. The AEDP 10 is also small enough to be easily hand carried and can be carried in a pocket. Furthermore, as most of the hardware required to build an AEDP is already required to build a paging unit. AEDP units can be manufactured at a cost which, at most, minimally increases the total cost associated with present numeric paging systems.

Other variations within the system of the present invention are also possible. For example, while some synergistic advantages of implementing both page receiving and alphanumeric entry have been identified above, clearly, the present AEDP could be used for many other yet to be identified purposes, and therefore, the AEDP should not be limited to the functions described above. In addition, while Turbo Code and TCII formats have been used to describe operation of the present AEDP, it is envisioned that the AEDP could be used with any signal generating protocol capable of sending messages via a telephone line. Moreover, the present AEDP may also include a page buffer as well known in the art, for storing one or more received pages while an earlier page is displayed or a user is using the receiving AEDP to enter or transmit a message. In addition, the present invention could be implemented with a key board which does not include all of the buttons identified above (e.g. perhaps the SEND button could provide the functions of both the SEND and DIAL buttons identified above).

Therefore, it is to be understood that the present invention is not limited to the embodiments described above, but embraces all such modified forms thereof as come within the scope of the following claims.

We claim:

1. A device for both entry of alphanumeric paging messages through a telephone into, and receiving alphanumeric paging messages from, a paging system, the device comprising a keyboard including a page button;

a visual display;

a speaker;

a receiver for receiving a radio frequency alphanumeric message; and a microprocessor connected to the keyboard, the display, the speaker, the receiver, and the dial button, and programmed to (i) accept the radio frequency message from the receiver;

(ii) display the radio frequency message on the display; (iii) accept an input message from the keyboard; (iv) display the input message from the keyboard on the display; (v) upon the pressing of the page button, generate an audible tone sequence which is transmitted to the speaker for acoustic simplex sound transmission to the telephone without an electronic link to the telephone, at least a portion of the audible tone sequence containing the alphanumeric message for the intended recipient, the audible tone sequence also including a DTMF tone sequence which dials the paging system telephone number of an intended recipient, the microprocessor programmed such that after pressing the page button, the device generates only the DTMF tone sequence, waits for a delay period sufficient for the paging system telephone to answer the sequence, and, after the delay period, generates the audible tone sequence which contains the alphanumeric message for the intended recipient.

2. A device as recited in claim 1 wherein the received message includes both a page message and response address information sufficient to address a response to the page message.

3. A device as claimed in claim 2 wherein the microprocessor includes a memory buffer to store a user directory, the user directory including a plurality of system user address entries, each address entry including sufficient information to address a paging system recipient, the response address information including data identifying at least one address entry.

4. A device as claimed in claim 1 wherein the microprocessor includes a memory buffer to store a user directory, the user directory including a plurality of system user address entries, each address entry including sufficient information to address a paging system user, and, wherein the keypad can be used to select at least one system user address entry to determine the intended recipient of a message.

5. A device as recited in claim 4 wherein the received message may include a memory update flag indicating that the received message includes instruction on how to alter the user directory, and, wherein, when the microprocessor accepts such a received message, the microprocessor alters the user directory accordingly.

6. A device as recited in claim 4 wherein each address entry includes a name, a personal identification number, and a paging system telephone number corresponding to a paging system user.

7. A device as claimed in claim 2 further including a send button connected to the microprocessor, and wherein, the microprocessor generates the audible tone sequence which contains the alphanumeric message for the intended recipient only after the send button is pressed.

8. A device as claimed in claim 1 wherein the tone sequence containing the alphanumeric message uses a Turbo Code II protocol.

9. A device as claimed in claim 7 wherein the dial and send buttons are located at one end of the device separated from the keyboard so as to be easily accessible by the user when the device is placed on the handset of a telephone.

10. A device as claimed in claim 1 wherein the device also stores an identification number of the user and transmits the identification number as a part of the audible tone sequence including the message.

11. A hand-held device for both entering alphanumeric paging messages into, and receiving alphanumeric paging messages from, a paging system by using a telephone with a handset, the device comprising a keyboard on one side of the device;

a visual display on the same side of the device as the keyboard;

a speaker;

a page button;

a send button;

a receiver for receiving radio frequency alphanumeric messages; and a microprocessor in the device connected to receive a radio frequency message from the receiver, the microprocessor also connected to receive input from the keyboard including a telephone number, an intended recipient, and a message, the microprocessor also connected to the display to display either the radio frequency message or the keyboard input, the microprocessor also connected to generate tones in the speaker, the microprocessor programmed to generate DTMF tones for the telephone number when the page button is pressed and to generate a tone sequence in audible tones carrying the identification of the intended recipient and the message when the send button is pressed, the DTMF tones and the tone sequence being transmitted through acoustic transmission from the speaker to the telephone handset, so that the user can place the device with the speaker over a handset of a telephone while still accessing the dial and send buttons.

12. A device as claimed in claim 11 where the device further comprises a program button that causes the device to initiate a series of prompts for use input of information in order to enter names, paging system telephone numbers and personal identification numbers of intended page recipients.

13. A device as claimed in claim 11 wherein the tone sequence containing the message uses an acoustic simplex protocol.

14. A device as claimed in claim 11 wherein the tone sequence encodes the message uses a Turbo Code II protocol.

15. A device as claimed in claim 11 wherein the dial and send buttons are located at one end of the device separated from the keyboard so as to be easily accessible by the user when the device is placed on the handset of the telephone.

16. A device as claimed in claim 13 wherein the tone sequence generated by the device for carrying the identification of the intended recipient and the message also carries an identification of the user.

17. The device as recited in claim 11 wherein the page button is on the opposite side of the device as the speaker.

18. The device as recited in claim 1 wherein the send and page buttons are located on an end of the device opposite the speaker.

* * * * *